United States Patent
Harris et al.

(10) Patent No.: US 6,205,783 B1
(45) Date of Patent: Mar. 27, 2001

(54) RESERVOIR ASSEMBLIES FOR HYDRAULIC VEHICLE BRAKING SYSTEMS

(75) Inventors: Alan Leslie Harris, Coventry; Keith Lawrence Holding, West Midlands; Robert George Uzzell; Ivan Mortimer, both of West Midlands, all of (GB)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/199,537

(22) Filed: Nov. 25, 1998

(30) Foreign Application Priority Data

May 29, 1996 (GB) ................................. 9611123
May 29, 1996 (GB) ................................. 9611124

(51) Int. Cl.$^7$ ........................................ B60T 11/32
(52) U.S. Cl. .................................... 60/582; 60/585
(58) Field of Search .................... 60/585, 586, 582, 60/574, 403, 404, 413, 418

(56) References Cited

U.S. PATENT DOCUMENTS

| | | | |
|---|---|---|---|
| 3,989,056 | * 11/1976 | Reinartz | .............................. 60/585 X |
| 4,455,832 | * 6/1984 | Gaiser et al. | ........................... 60/581 |
| 4,500,761 | * 2/1985 | Kubota et al. | ....................... 60/585 X |
| 4,505,113 | * 3/1985 | Reinartz et al. | .................... 60/585 X |
| 4,678,242 | * 7/1987 | Belart | ................................. 60/582 X |
| 4,981,016 | 1/1991 | Coleman . | |
| 5,065,573 | * 11/1991 | Nomura et al. | ..................... 60/582 X |

FOREIGN PATENT DOCUMENTS

| | | |
|---|---|---|
| 537667 | 10/1931 | (DE) . |
| WO 80/02012 | 10/1980 | (WO) . |

* cited by examiner

*Primary Examiner*—Hoang Nguyen
(74) *Attorney, Agent, or Firm*—MacMillan, Sobanski & Todd, LLC

(57) ABSTRACT

A reservoir assembly for a vehicle hydraulic braking system includes two chambers (2, 3) for the storage of hydraulic fluid. The reservoir assembly is provided with a structure for increasing the effective volume of one of the chambers (2), for example a bellows (12) or a bucket (30), and which may be operable in conjunction with the fitting of a filler cap (17) to seal a filler opening (5) for that chamber. This enables a volume of fluid to be accommodated in a chamber of increased volume, thereby substantially eliminating the possibility of volume in excess of a given volume from overflowing from the chamber (2, 3). When the reservoir assembly is installed in a vehicle braking system of a brake-by-wire electro-hydraulic type (EMB) having a first power circuit (51), and a second back-up hydrostatic circuit (60), the one chamber (2) supplies fluid to the hydrostatic circuit, and the other chamber (3) supplies fluid to the power circuit.

10 Claims, 6 Drawing Sheets

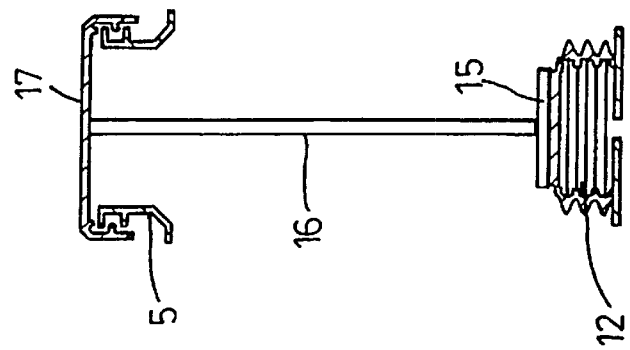
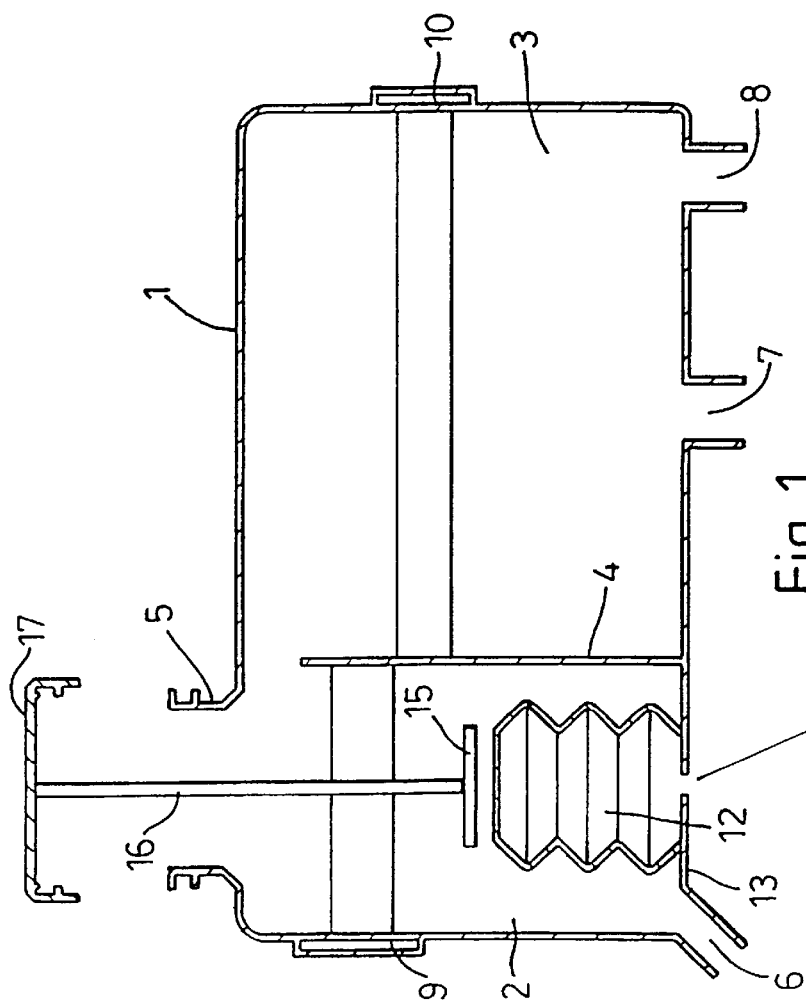

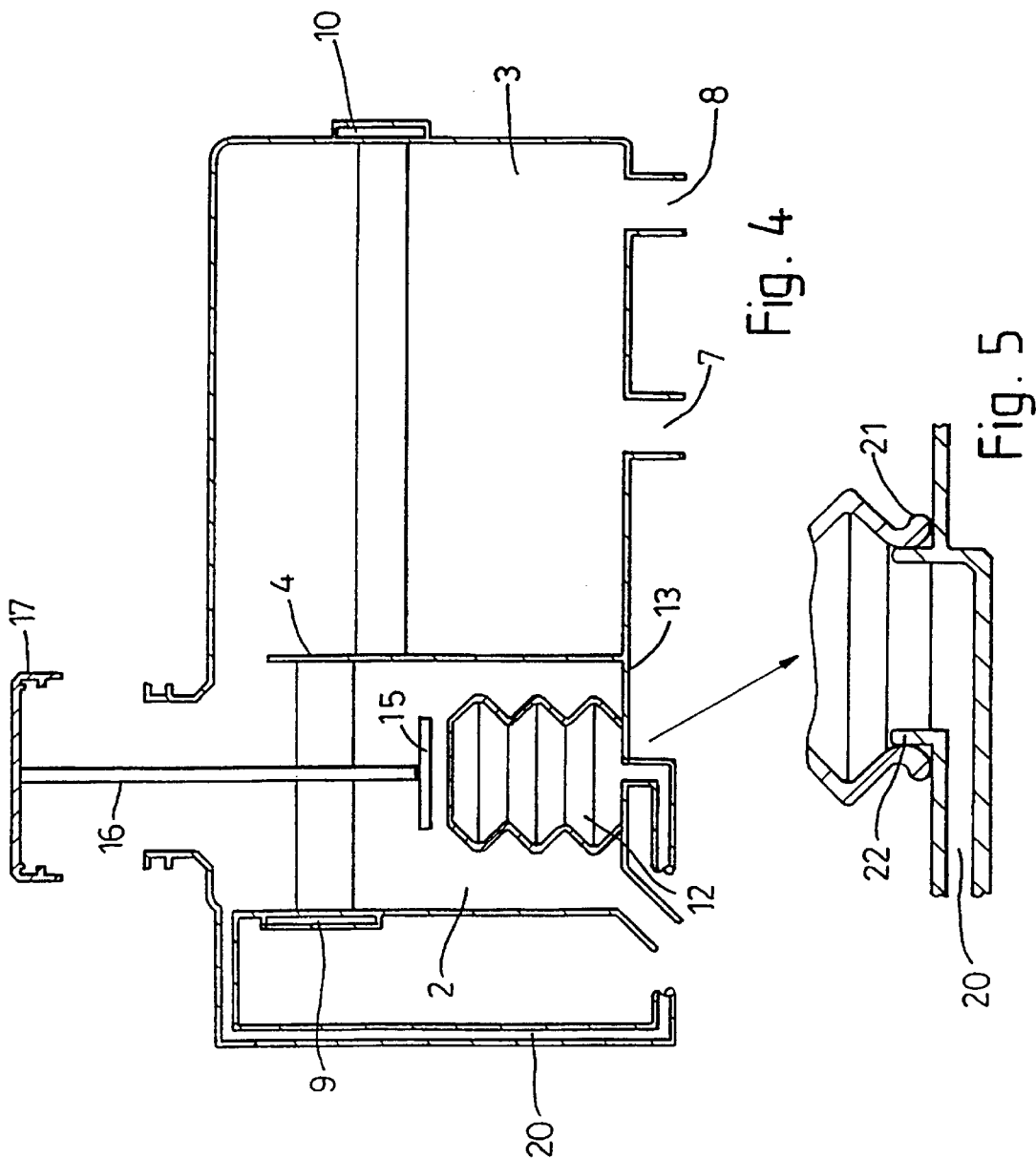

RESERVOIR ASSEMBLIES FOR HYDRAULIC VEHICLE BRAKING SYSTEMS

This invention relates to reservoir assemblies for vehicle hydraulic braking systems.

There is a problem of overfilling reservoir assemblies with the attendant risk that overflow may occur which is not only messy but represents a fire hazard. This may occur simply by filling to the top, above the marked "max" level. In braking systems in which the reservoir assembly contains a volume of fluid for supplying a pump, which in turn charges an accumulator, if the reservoir is overfilled whilst the accumulator is charged, subsequent discharge from the accumulator could cause overflow with the inherent problems discussed above.

In addition, in vehicle hydraulic braking systems of the kind in which a wheel brake is adapted to be applied by a first power circuit comprising a source of hydraulic fluid under pressure under the control of the control valve, and a second back-up hydrostatic circuit capable of actuating the brake hydrostatically from a pedal-operated master cylinder upon failure of the first circuit, each circuit is supplied with hydraulic fluid from a dedicated reservoir. Typically such a braking system may be of the brake-by-wire electro-hydraulic type (EMB) in which the control valve comprises a solenoid-operated valve which is operated by an energising current from an electronic control unit and of which the magnitude is determined by operation of a brake-pedal. The source of hydraulic fluid under pressure may be provided by a gas-charged hydraulic accumulator.

In such known hydraulic braking systems it is desirable to separate the fluid in the hydrostatic circuit from that in the first power circuit. However certain faults in the system will cause fluid from the reservoir of one circuit to be transferred to the reservoir of the other circuit. Such fluid transfer could take place in either direction. The fault will, ultimately, be detected by a fluid level warning indicator (FLWI) with which each reservoir is incorporated. One FLWI will be actuated by reduced fluid level in its associated chamber, but it may not be possible for the system to diagnose accurately the original cause. In such systems a service engineer may change a wrong major component of a particular circuit.

Faults which may cause fluid to transfer from one reservoir to the other may comprise:
a) leakage of a seal which separates the back-up hydrostatic circuit from return to reservoir line of the first power circuit; and/or
b) blocking of a return line from a solenoid-operated valve to the reservoir.

Unless the fault is diagnosed correctly a complete solenoid-operated valve may be replaced unnecessarily when all that has occurred is blockage of a return line.

If fluid in a reservoir is simply replenished, without identifying and fixing the real fault, a warning lamp of the FLWI might be extinguished but over flow will eventually occur without warning, at the other reservoir. Not only is this messy but, more importantly, represents a fire hazard, as discussed above.

Of course the problem can be overcome by the provision of two separate reservoirs, each provided with an individual filling point. However it is preferable for the two reservoirs to have a single, common, filling point. The most convenient way to achieve this would be to combine the two reservoirs into a common tank containing two chambers separated by a baffle in a manner similar to known reservoirs fitted to pedal-operated master cylinders of the tandem type. Such a combined tank will neatly avoid the risk of over flow from a reservoir, but will neutralise attempts to detect those faults causing fluid transfer. Excess fluid in one chamber of the tank will spill over into the other chamber, so that the levels will not change. It would, of course, be a simple matter to arrange for the baffle height to exceed the normal maximum level for one of the two chambers, but this would only allow transfer detection in one sense. Such transfer cannot take place in an opposite direction from the chamber of the first power circuit to the chamber of the second back-up hydrostatic circuit because after filling the tank, the fluid level in the chamber for the second back-up hydrostatic circuit will always be level with the top of the baffle. Any additional fluid introduced, for example to compensate for leakage due to a blocked return line as described above, will merely flow over the baffle and back into the chamber supplying the first power circuit.

According to one aspect of our invention, in a reservoir assembly for a vehicle hydraulic braking system and including at least one chamber for the storage of hydraulic fluid, the reservoir assembly is provided with means for increasing the effective volume of the chamber.

This enables a volume of fluid to be accommodated in a chamber of increased volume, thereby substantiously eliminating the possibility of volume in excess of a given volume from overflowing from the chamber.

Conveniently means for increasing the effective volume of the chamber is operative automatically with fitting of a filling cap onto the reservoir assembly to seal a filler opening for that chamber.

According to another aspect of our invention in a reservoir assembly for a vehicle hydraulic braking system comprising a common tank for hydraulic fluid which is divided internally into first and second chambers by means of an imperforate baffle and the tank has a single filler opening through which one of the chambers can be filled directly with the other chamber being filled indirectly to a given level by spillage over the baffle, the said one chamber is provided with means for increasing its effective volume automatically with fitting of a filling cap onto the tank to seal the filler opening.

Increasing the effective volume of the said one chamber ensures that the fluid level in that chamber is reduced below baffle height sufficiently to prevent fluid from that chamber from spilling over the baffle and into the other chamber. This is achieved by accommodating a given volume of fluid in a chamber of which the effective volume has been increased.

When the reservoir is installed in the vehicle hydraulic braking system of the known type described above, the said one chamber supplies fluid to the second back-up hydrostatic circuit and the other chamber supplies fluid to the first power circuit. This enables any transfer of fluid, for example because of seal leakage, from the power circuit to the hydrostatic circuit to be detected as a result of change in the level of fluid in the said one chamber. Unless the original level is below baffle height it will merely spill over.

The means for increasing the effective volume of the said chamber comprises a hollow member housed within the chamber and moveable from the first position, in which it defines within the chamber a first given volume, into a second position, in which the effective volume of the chamber is increased to a second given volume, and in which the volume of fluid which can then be accommodated within the chamber lies below the baffle height.

The hollow member may comprise a bellows which is located in the fully extended position when the chamber is filled with fluid and in which the chamber is of a first given volume but which is contracted by co-operation with the filler cap to increase the effective volume of the chamber to the second given volume. The bellows is sealed from the interior of the chamber so that no fluid enters the bellows.

The interior of the bellows may be exhausted to atmosphere. Alternatively it may be connected by a pipe into the reservoir above the fluid level. Not only does this ensure that no vacuum is created within the interior of the bellows, but it also enables any fluid permeating through the wall of the bellows to be returned to the reservoir, rather than be lost to the system.

In another construction the hollow member may comprise a hollow bucket which is displaced downwardly into the chamber as the filler cap is fitted onto the tank, initial movement of the bucket acting to displace the fluid over the baffle into the other chamber and reduce the effective volume of the chamber with subsequent movement of the bucket below the surface of the fluid acting to accommodate fluid within the bucket by spillage over its rim, whereby to lower the level of fluid within the chamber below the baffle height.

In braking systems in which the source of hydraulic fluid under pressure is provided by a gas-charged hydraulic accumulator, the gas charge is separated from the hydraulic fluid by a flexible membrane. Under certain conditions, particularly exascebated by operating conditions experienced in hot countries, there is a propensity for the pre-charged gas to migrate through the membrane, thereby reducing the system's useful energy-storage capacity. Such deterioration would be noticed only when the system failed to fulfil a driver's braking demand. Unexpected failure after a short life is unacceptable for systems of the EMB type.

The problem could be overcome by providing hydraulic accumulators in which negligible degradation occurs. However such accumulators are likely to expensive or bulky, or both.

Improved versions of present gas-charged accumulators could be acceptable, provided a warning could be given before a dangerous degree of deterioration had occurred. In its present form the known system has only very limited information about the circuit for charging the accumulator. If the accumulator were to be discharged completely it would be a simple matter for the system to identify the knee-point in pressure v. time characteristic which occurs when the pre-charged pressure is reached either during discharge or whilst charging from zero pressure. However, to do this routinely, will involve impairing the performance of the system, by discharging the accumulator deliberately. This is unacceptable. Whilst it is true that discharge may occur occasionally because of natural leakage, for example when a vehicle is parked for a considerable time, say over a week-end, there is no way of ensuring that it happens sufficiently often, or even at all, in service. Therefore such a method is unacceptable.

In another approach the system can monitor the charging-time needed to achieve a given rise in accumulator pressure. Whilst this can be indicative of pre-charged pressure the absence of any change on the expected result will not mean that a fault had not occurred. The effects upon charging time of pre-charged loss would be similar, but in the opposite sense, to the effects of a similar degree of loss in the efficiency of a pump for charging the accumulator. Thus the occurrence of either one of the two faults, without the other, could be reliably detected, but such detection would be difficult to achieve if both components deteriorated at the same time. Fluid leakage from the pressurised system to the reservoir during charging, for example through the control valve, would have a similar effect to that of reduced pump efficiency.

In addition to the above uncertainties, the pressure of the gas, and thus the charging characteristic, depends not only upon the remaining mass of gas, but also upon its temperature. That is to say the charging time will vary with temperature even if no gas leakage has occurred. In the absence of temperature data only large gas losses, greater than substantially 40%, could be reliably detected, even without pump degradation or leakage. Thus adequate warnings cannot be guaranteed by this method under realistic operating conditions, unless gas temperature can be inferred.

According to another aspect of our invention in a vehicle hydraulic braking system incorporating a source of hydraulic fluid under pressure, the reservoir is provided with a proportional fluid level sensor.

Preferably the source of hydraulic fluid under pressure comprises a gas charged hydraulic accumulator.

The proportional fluid level sensor enables the system to identify loss of volume in the reservoir, for example due to withdrawal of fluid from the reservoir to compensate for change in volume in the accumulator as a result of migration of gas through the membrane in the accumulator and/or degradation of the pump for charging the accumulator. Thus such a loss of volume as indicated by the sensor, is indicative of loss of pressure in the accumulator.

The detection process will involve comparing against predetermined expectations the volume drawn from the reservoir during charging between two pressures. i.e. ml/bar, not just ml.

If ambient temperature was known then the expectations could be formulated quite accurately, enabling relatively small gas losses to be detected; although still not instantly. If, as will almost certainly be the case, ambient temperature is unknown, or has to be inferred from other data, then the expectations must be formed with a correspondingly larger tolerance, i.e. larger gas losses will be needed before confident detection will be possible.

In the absence of operation of the hydraulic braking system it is clear that any net volume drawn from the reservoir during charging must end up in the accumulator. Thus almost any non-braking portion of a charging cycle should be sufficient to perform the check. Since gas migration is a long-term effect it should be easy to find sufficient opportunities to monitor the gas volume and provide a timely warning. Thus our invention enables confident detection at a usefully early stage.

Some embodiments of our invention are illustrated in the accompanying drawings in which:

FIG. 1 is a schematic longitudinal section through a reservoir assembly for a vehicle hydraulic braking system with a filler cap removed from a tank FIG. 2 is a diagrammatic view of the filler cap in position;

FIG. 3 is a view on a enlarged scale of the installation of the lower end of a bellows in the tank;

FIG. 4 is a view similar to FIG. 1 but showing a modification;

FIG. 5 is a view on an enlarged scale of the co-operation between the lower end of the bellows and the tank;

Figure 6:
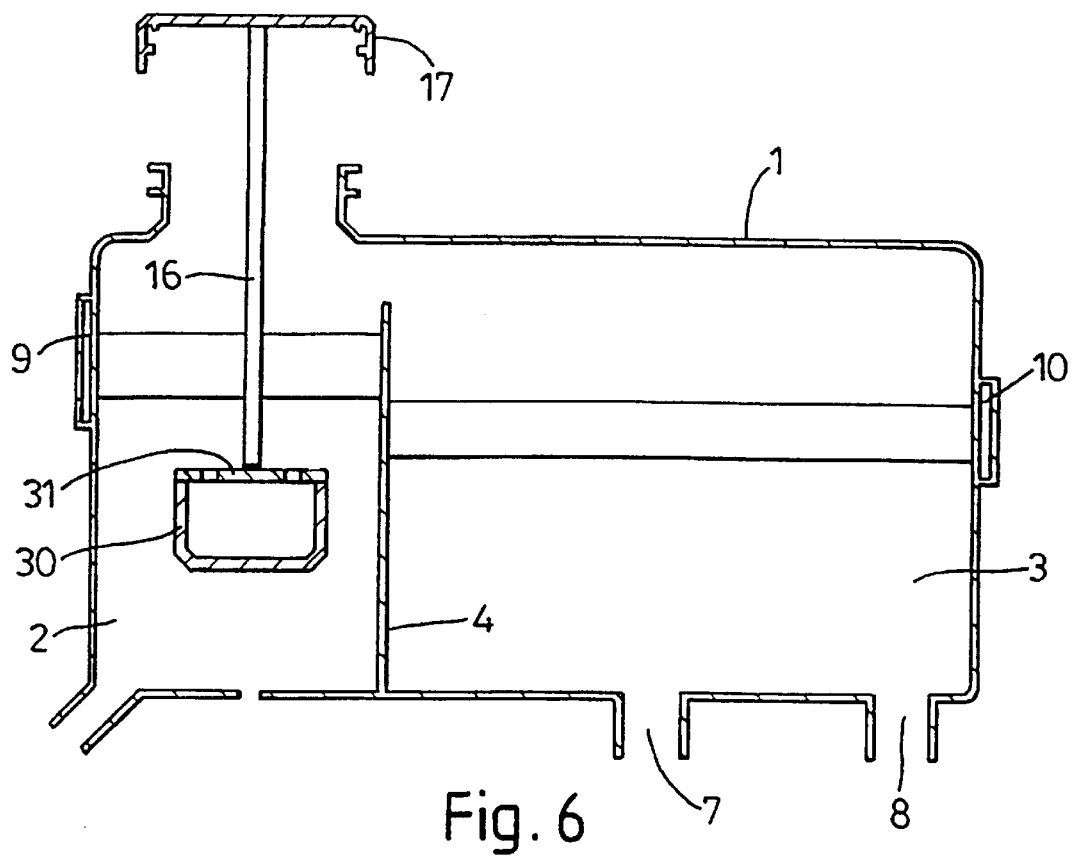
FIG. 6 is a schematic longitudinal section through another reservoir assembly.

The reservoir assembly illustrated in FIGS. 1–3 of the accompanying drawings comprises a tank 1 which is divided into a first chamber 2 and a second chamber 3 by means of an upstanding imperforate baffle 4. The tank 1 is adapted to be filled through a single filler opening 5 immediately over the chamber 2 with the chamber 3 being filled by spillage over the baffle 4.

When the reservoir assembly is installed in a vehicle hydraulic braking system, the chamber 2 supplies fluid to a back-up hydrostatic circuit through an outlet 6, and the chamber 3 supplies fluid to a power circuit with fluid being supplied to a pump from an outlet 7 and returned to the reservoir assembly through an inlet 8.

Each chamber 2, 3 is supplied with respective fluid level sensors 9, 10.

A flexible bellows 12 is housed within the chamber 2 being upstanding from its base 13. As illustrated in FIG. 3 an edge of the base 13 surrounding an opening and comprising an exhaust is sealingly received in an outwardly directed sealing groove at the base of the bellows 12. At its upper end the bellows 12 is sealed from the interior of the chamber. A circular plate 15 is carried from the lower end of a rod 16 which, in turn, depends axially from a filler cap 17 for sealing the filler opening 5.

As illustrated in FIG. 1 of the drawings the bellows 12 is normally fully extended to reduce the effective volume of the chamber 2. The tank is filled through the filler opening 5 with fluid spilling over the baffle 4 until that fluid in the chamber 3 is at a desired level, as indicated by a marking on the tank. At that point fluid in the chamber 2 is substantially at baffle height. Thereafter the filler cap 17 is replaced, initially with a small volume of fluid being displaced over the baffle 4 and into the chamber 3 by the volume of the entering plate 15 and the rod 16. The plate 15 then co-operates with the upper end of the bellows 12 and progressively contracts the bellows 12 to its fully contracted position illustrated in FIG. 2. Such contraction of the bellows 12 reduces the effective volume of the chamber 2 in order to lower the level of fluid in that chamber from baffle height to a desired maximum level below baffle height.

Since the levels of fluid in the two chambers 2 and 3 are below the height, of the baffle 4 under no circumstances can volumes of the two fluids mix. This ensures that faults associated with one circuit cannot be confused with faults associated with the other circuit. Specifically fluid transfer, as a result of seal leakage, from the power circuit at higher pressure to the hydrostatic circuit at lower pressure will be apparent as an increased level in the chamber 2 accompanied by a corresponding decrease in the level of the chamber 3. Other faults, such as leakage to atmosphere affect the level in a respective chamber only.

In the modified construction illustrated in FIG. 4 the interior of the bellows 12 is connected to the upper end of the tank through a pipe 20. As illustrated in detail in FIG. 5 the lower end of the bellows has a radial bead 21 which seals around an upstanding rim 22 surrounding an opening in the base 13 and which leads to the pipe 20.

The provision of the external pipe 20 ensures that any fluid permeating into the interior of the bellows 12 during the service life of the reservoir assembly will be retained in the system and returned to tank, rather than being lost to the system by possible leakage, which may occur with the construction described above with reference to FIGS. 1–3 of the accompanying drawings.

In the construction illustrated in FIG. 6 the bellows 12 is omitted and a hollow bucket 30 is carried from the lower end of the rod 16. The bucket comprises a container having an upper or top wall 31 of perforated construction and by means of which the bucket 30 is carried from the rod 16.

In operation both chambers 2 and 3 of the tank 1 are filled as described above. When the level in the chamber 3 is at baffle height the bucket is inserted into the chamber 2, initially to displace the fluid from the chamber 2 over the baffle 4 and into the chamber 3. When the plate 31 is submerged fluid enters the bucket 30 through the perforations in the top wall 31, in turn to accommodate the fluid from the chamber 2, thereby reducing its effective volume and, in consequence, fluid level below baffle height.

Again, in the construction of FIGS. 6, since the final, filled, volume of fluid in chamber 2 is below that of the baffle 4 it is impossible for fluid in chambers 2 and 3 to mix during the service life of the reservoir assembly.

The bucket 30 includes drain openings through which fluid can drain back into the chamber 2 as the filler cap 17 is removed from the tank 1.

Figure 7:
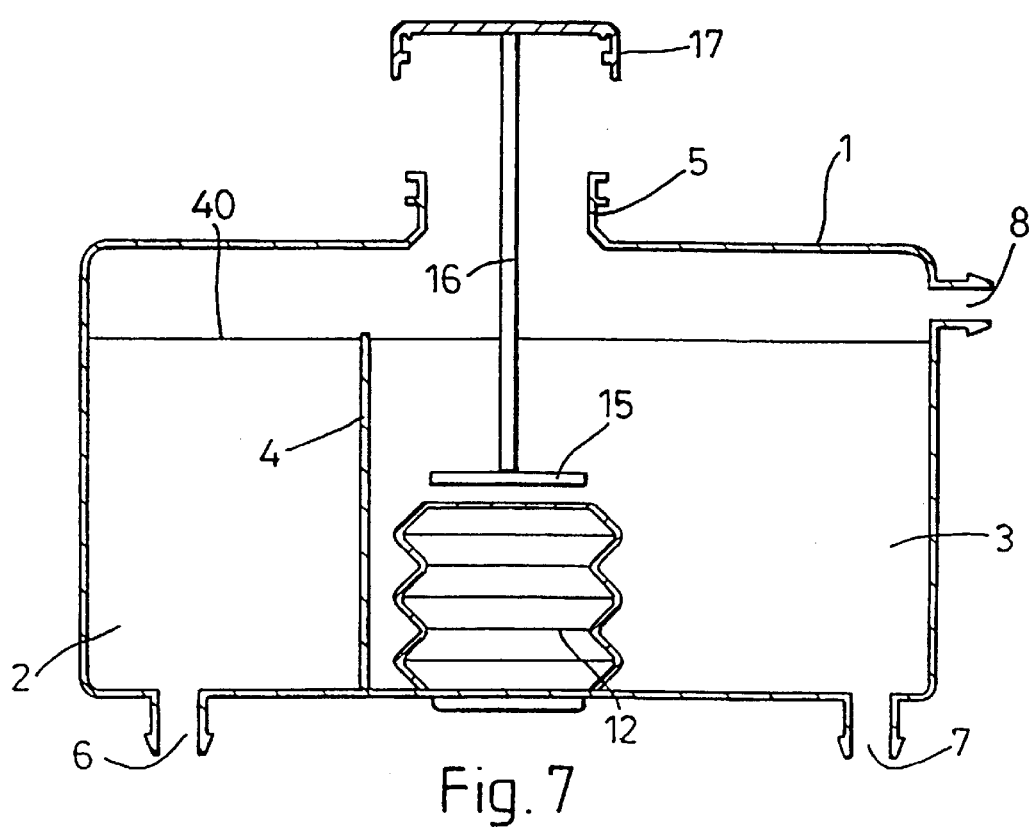
FIG. 7 is another view similar to FIG. 1 but showing a modification.

In the reservoir assembly illustrated in FIG. 7 of the accompanying drawings the filler opening 5 supplies fluid directly to the chamber 3 for the pump circuit, and the rod 16 co-operates with the bellows 12 which is itself housed within the chamber 3, through the circular plate 15. The inlet 8 to the chamber 3 is located in the wall of the tank above maximum fluid level 40 substantially determined by the baffle height.

Normally the tank will be filled to the maximum level 40. However, should the tank be filled to a height above that level, which might be permitted by additional volume above the baffle 4, then the risk of overflow is serious.

The situation described above is exacerbated if the tank is filled to overflowing whilst an accumulator of the power circuit is charged by the pump.

When the filler cap 17 is replaced, as in the embodiment of FIGS. 1–3, the bellows 12 is contracted to increase the effective volume of the chamber 3, whereby to accommodate any excess fluid below the maximum fluid level line 40, including any fluid returned from the accumulator through the inlet 8.

The capacity of the bellows 12 is chosen to be sufficient to accommodate the maximum stored volume, thus ensuring that overflow will not occur.

In the reservoir assembly illustrated in FIG. 2 of the drawings the walls of the tank may be of stepped or increased thickness in a direction towards the base of the tank.

In such a construction an acoustic transducer may be incorporated as a fluid-level sensing means, with the transducer operating in the ultrasonic range. A pulse of sound is generated by a small strip of piezo material located in the side of the tank and acting as a loudspeaker. The transducer is then switched to act as a microphone, so that the presence or absence of fluid at the inner tank wall can be deduced from the amplitude of the reflected signal. (Arrival time can be used as well if a metal reflector is positioned opposite the sensor.)

If an electrically-partitioned strip is aligned behind the stepped wall section of the tank (in the vertical direction), then the step at which fluid is first detected would be easy to identify. Such a multi-stage switched (quaisi-proportional ) sensor could constitute each of the sensors 9 and 10 in the construction described above.

Figure 8:
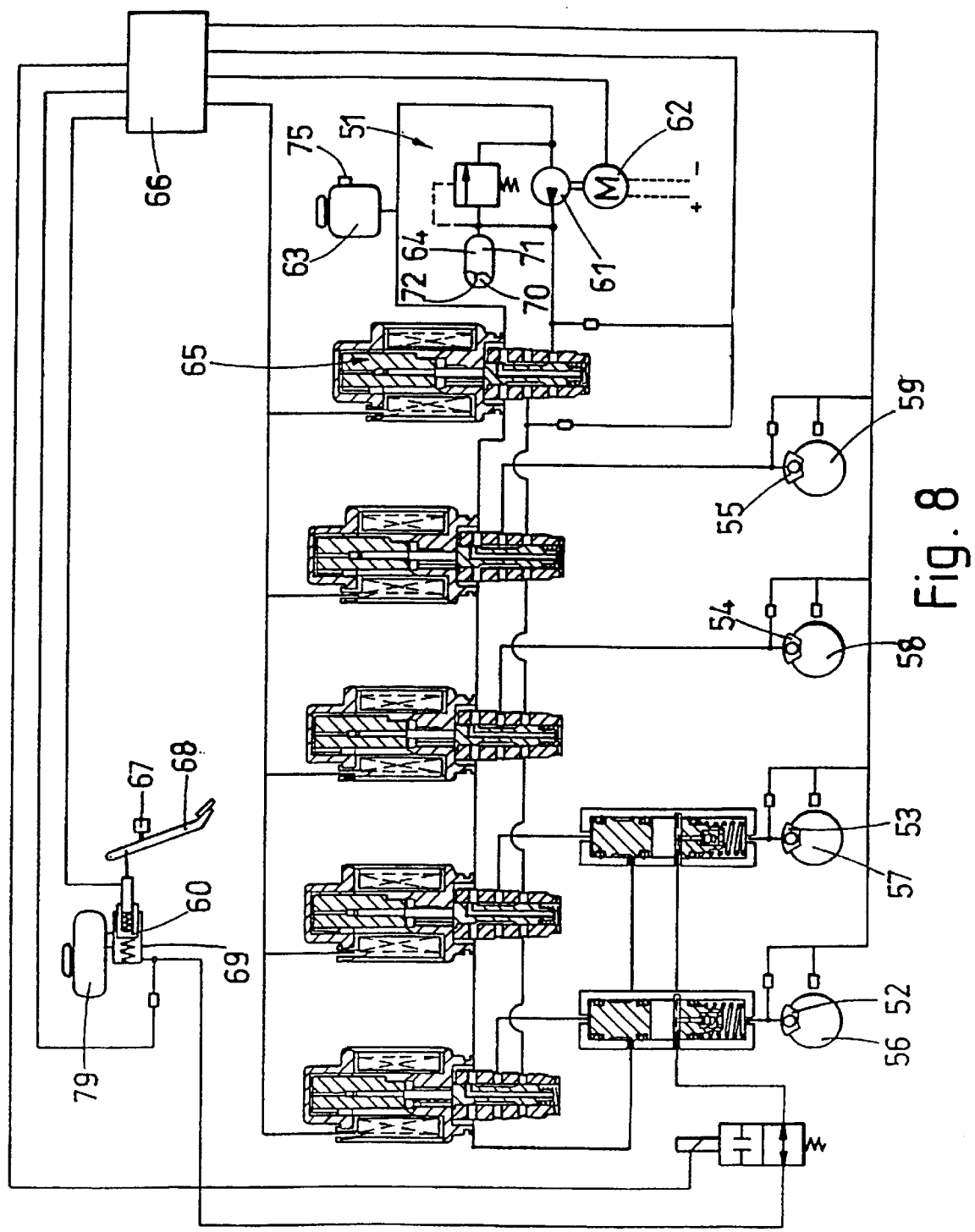
FIG. 8 is a layout of a braking system of the EMB type.
Figure 9:
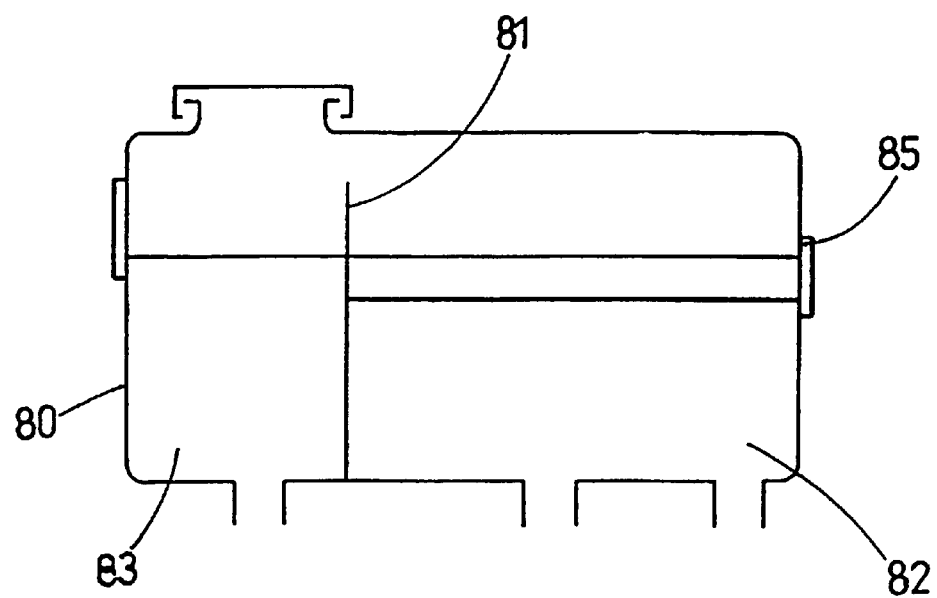
FIG. 9 is schematically longitudinal cross-section through a typical reservoir assembly for use in the system of FIG. 8.
Figure 10:
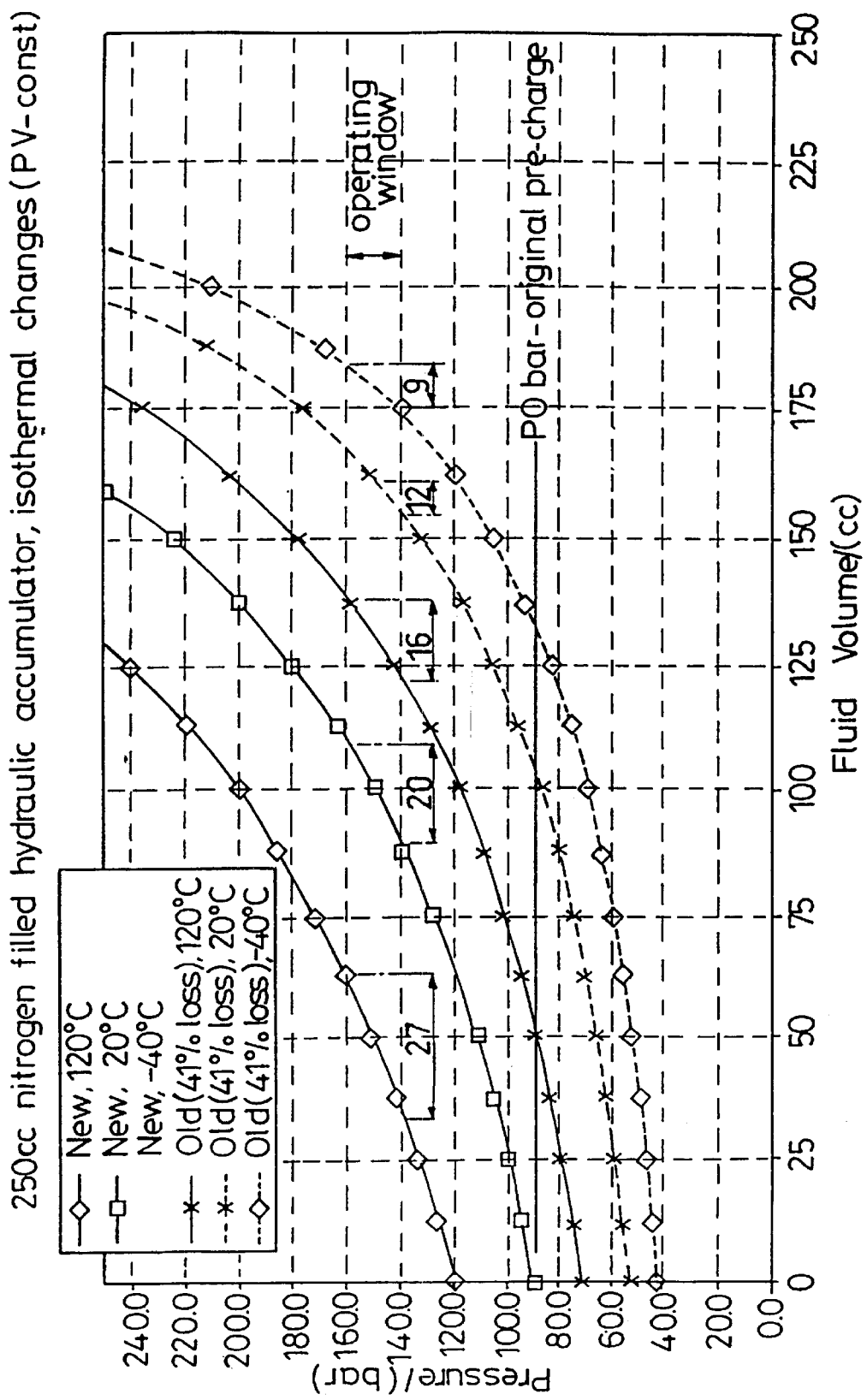
FIG. 10 is a graph showing the relationship between pressure and volume in an hydraulic accumulator.

In the vehicle hydraulic braking system illustrated in FIGS. 8–10 of the accompanying drawings a first power circuit 51, is provided for applying brakes 52, 53, 54, 55 on wheels 56, 57, 58, 59 for normal service braking, and an emergency or hydraulic brake circuit 60 is provided for applying the brakes on failure of the power circuit 51.

The power circuit 51 comprises a pump 61 driven by a motor 62 and which is adapted to draw fluid from a reservoir 63 in order to charge an hydraulic accumulator 64 which, in turn, provides the power to apply the brakes for normal service braking under the control of a master solenoid-operated control valve 65. An energising current to operate the control valve 65 is supplied from an electronic control unit 66 which, in turn, receives demand signals from a potentiometer 67 responsive to driver operation of a pedal 68. Upon failure of the power circuit 51 the pedal 68 operates a master cylinder 69 comprising the hydrostatic circuit 60.

The accumulator 64 is of the gas-charged type in which a volume of gas under pressure is disposed in a chamber 70 separated from hydraulic fluid in a chamber 71 by means of a flexible membrane 72 constructed of elastomeric material.

The reservoir 63 is provided with a proportional level sensor 75 which provides a continuous indication of the volume of fluid in the reservoir. Thus any reduction in volume of fluid in the reservoir 63 will indicate to the driver that a corresponding reduction in pressure has occurred in the hydraulic accumulator 64. This may be due to migration of the gas through the membrane and/or degradation of the pump.

In the system illustrated in FIG. 8 of the drawings the reservoir 63 for the power circuit 51 is separate from a reservoir 79 for the master cylinder 69. For ease of installation it is preferable to combine the two reservoirs into a single reservoir assembly as illustrated in FIG. 9 of the accompanying drawings.

In the reservoir assembly illustrated in FIG. 9 a tank 80 is divided by a baffle 81 into a larger chamber 82 and a smaller chamber 83. The larger chamber 82 defines the reservoir for the power circuit 51, and the smaller chamber 83 defines the reservoir for the hydrostatic circuit 60.

The larger chamber 82 is provided with a proportional level sensor 85 which performs the same function as the level sensor 75 illustrated in the layout of FIG. 8.

The relationship between pressure and volume in an hydraulic accumulator is illustrated in the graph of FIG. 10.

As illustrated in FIG. 10, the effects of temperature are only completely distinguishable from the effects of ageing when more than 41% of the gas has been lost. Until then, the deteriorated pressure @ 120° C. will be higher than the pressure new @ 0.40° C. Unless temperature is measured, or inferred in some way this would be the limit of reasonable prediction. If temperature was known, much more accurate predictions could be made of accumulator deterioration.

The pressure could be measured by deliberately discharging the accumulator completely pressure will drop to about zero, then starting the pump and either noting the pressure after a very short duration (e.g. 1 second, 5 cc) or when the initial very sharp pressure rise rate has fallen. Another method would be to note the pressure at the minimum fall rate, which would be just before the accumulator reaches complete discharge. The obvious problem with either of these is that it temporarily disables normal brake operation. The key may be to establish some safe condition when brakes will not be required, such as stationary with parking brake applied.

Because the spool leakage is so low compared to pump rates, assume initially that it is zero. Even a ten-fold increase would make it still less than a tenth of the pump rate. This gives the following hand calculations for pump times from 140 to 160 bar: @ 20° C.

new pump, new accumulator=20 cc/5 cc/sec=4 seconds
old pump, new accumulator=20/2.5=8 seconds
new pump, old accumulator=12/5=2.4 seconds
old pump, old accumulator=12/2.5=5 seconds This shows that the two deterioration effects tend to cancel each other as far as pump up times is concerned.

What is claimed is:

1. A reservoir assembly for a vehicle hydraulic braking system including means defining at least one chamber for storage of hydraulic fluid, means defining a filler opening, and a filling cap adapted to be fitted onto said reservoir assembly to seal said filler opening for said chamber, wherein said reservoir assembly is provided with means for increasing the effective volume of said chamber, said means being operative automatically with fitting of said filling cap onto said reservoir assembly to seal said filler opening.

2. A reservoir assembly for a vehicle hydraulic braking system comprising a common tank for hydraulic fluid, an imperforate baffle dividing said tank internally into first and second chambers, and said tank has a single filler opening through which one of said chambers can be filled directly with said other chamber being filled indirectly to a given level by spillage over said baffle, a filling cap for closing said filling opening, wherein the said one chamber is provided with means for increasing the effective volume thereof automatically with fitting of said filling cap onto said tank to seal said filler opening.

3. A reservoir assembly according to claim 2 wherein said means for increasing said effective volume of the said chamber comprises a hollow member housed within said chamber and moveable from said first position, in which it defines within the chamber a first given volume, into a second position, in which said effective volume of said chamber is increased to a second given volume, and wherein the volume of fluid which can then be accommodated within the chamber lies below the height of said baffle.

4. A reservoir assembly according to claim 2 wherein said means for increasing said volume comprises a bellows which is located in a fully extended position when said chamber is filled with fluid and in which the chamber is of a first given volume but which is contracted by co-operation with said filler cap to increase said effective volume of said chamber to second given volume.

5. A reservoir assembly according to claim 4 wherein said bellows is sealed from the interior of said chamber so that no fluid enters the bellows.

6. A reservoir assembly according to claim 4 wherein the interior of said bellows is exhausted to atmosphere.

7. A reservoir assembly according to claim 4 incorporating a pipe for connecting said bellows into said reservoir above the fluid level.

8. A reservoir assembly according to claim 2 wherein said means for increasing the volume comprises a hollow bucket having a rim and which is displaced downwardly into said chamber as said filler cap is fitted onto said tank, initial movement of said bucket acting to displace fluid over said baffle into said other chamber and reduce the effective volume of said chamber with subsequent movement of said bucket below the surface of fluid acting to accommodate fluid within said bucket by spillage over said rim, whereby to lower the level of fluid within said chamber below the baffle height.

9. A vehicle hydraulic braking system comprising a wheel brake adapted to be applied by a first power circuit comprising a source of hydraulic fluid under the control of a control valve, and a second back-up hydrostatic circuit capable of actuating said brake hydrostatically from a pedal-operated master cylinder upon failure of said first circuit, each circuit being supplied with fluid from a reservoir assembly, wherein the said one chamber supplies fluid to said second back-up hydrostatic circuit, and said other chamber supplies fluid to said first power circuit, and wherein said reservoir assembly comprises a common tank for hydraulic fluid, an imperforate baffle dividing said tank internally into first and second chambers, and said tank has a single filler opening through which one of said chambers can be filled directly with said other chamber being filled indirectly to a given level by spillage over said baffle, a filling cap for closing said filling opening, wherein the said one chamber is provided with means for increasing the effective volume thereof automatically with fitting of said filling cap onto said tank to seal said filler opening.

10. A braking system according to claim 9 wherein said system is of a brake-by-wire electro-hydraulic type (EMB) in which said control valve comprises a solenoid-operated valve which is operated by an energising current from an electronic control unit and of which the magnitude is determined by operation of a brake pedal, and said reservoir assembly is provided with a substantially proportional fluid level sensor.

* * * * *

UNITED STATES PATENT AND TRADEMARK OFFICE
CERTIFICATE OF CORRECTION

PATENT NO.    : 6,205,783 B1
DATED         : March 27, 2001
INVENTOR(S)   : Alan Leslie Harris, et al.

It is certified that error appears in the above-identified patent and that said Letters Patent is hereby corrected as shown below:

<u>Title page,</u>
Insert "Related U.S. Application Data" as following [63] "Continuation of application No. PCT/GB97/01327, filed on May 15, 1997.

Signed and Sealed this

Fourth Day of September, 2001

*Attest:*

NICHOLAS P. GODICI
*Attesting Officer*     *Acting Director of the United States Patent and Trademark Office*